US012320383B2

(12) United States Patent
Yuan et al.

(10) Patent No.: US 12,320,383 B2
(45) Date of Patent: Jun. 3, 2025

(54) CONNECTOR FOR CURTAIN RODS (71) Applicant: Zhejiang Huaaokang Home Furnishings Co., Ltd, Zhejiang (CN)

(72) Inventors: Mingbo Yuan, Zhejiang (CN); Jinyan Wang, Zhejiang (CN); Diandian Wang, Zhejiang (CN)

( * ) Notice: Subject to any disclaimer, the term of this patent is extended or adjusted under 35 U.S.C. 154(b) by 0 days.

(21) Appl. No.: 18/916,639

(22) Filed: Oct. 15, 2024

(65) Prior Publication Data
US 2025/0035142 A1 Jan. 30, 2025

(30) Foreign Application Priority Data
Aug. 8, 2024 (CN) .......................... 202421929076.8

(51) Int. Cl.
*F16B 7/18* (2006.01)

(52) U.S. Cl.
CPC .................... *F16B 7/182* (2013.01)

(58) Field of Classification Search
CPC .. F16B 2/04; F16B 2/14; F16B 7/0413; F16B 7/042; F16B 7/0446; Y10T 403/557; Y10T 403/555; Y10T 403/55; Y10T 403/7041; Y10T 403/7052
See application file for complete search history.

(56) References Cited

U.S. PATENT DOCUMENTS

| 2,657,944 | A | * | 11/1953 | Miller | E01B 25/10 403/362 |
| 3,000,656 | A | * | 9/1961 | Hollaender | F16B 7/0413 403/292 |
| 3,759,623 | A | * | 9/1973 | Hesse | F16B 7/0413 403/375 |
| 4,671,478 | A | * | 6/1987 | Schoenig | F16M 11/245 248/123.2 |
| 4,859,109 | A | * | 8/1989 | Targetti | F16B 7/0413 403/362 |
| 5,059,057 | A | * | 10/1991 | Graef | A61F 2/3607 403/292 |
| 5,061,000 | A | * | 10/1991 | Haugen | B60P 3/42 296/3 |
| 5,083,882 | A | * | 1/1992 | Liu | E04H 15/32 403/295 |
| 5,102,254 | A | * | 4/1992 | Yeh | E04B 2/7431 403/174 |
| 5,203,135 | A | * | 4/1993 | Bastian | F16B 7/0413 403/292 |
| 5,219,449 | A | * | 6/1993 | Hoshino | F16B 7/0413 403/292 |
| 5,287,869 | A | * | 2/1994 | Wu | A45B 19/04 135/25.4 |

(Continued)

*Primary Examiner* — Daniel J Wiley (74) *Attorney, Agent, or Firm* — Hawaii Patent Services; Nathaniel K. Fedde; Kenton N. Fedde (57) ABSTRACT A connector for curtain rods comprises a connector body for connecting two adjacent curtain rods, wherein the connector body is formed by splicing a first connecting part and a second connecting part, and an adjusting bolt is inserted between the first connecting part and the second connecting part; wherein, when two curtain rods are respectively inserted into two ends of the spliced first connecting part and the spliced second connecting part, the adjusting bolt penetrates through the first connecting part and then abuts against the second connecting part.

18 Claims, 4 Drawing Sheets (56) References Cited

U.S. PATENT DOCUMENTS

| | | | | |
|---|---|---|---|---|
| 5,387,048 | A | * | 2/1995 | Kuo ........................ A45B 19/04 135/25.1 |
| 5,409,122 | A | * | 4/1995 | Lazarus ............... A47B 47/028 403/312 |
| 5,642,957 | A | * | 7/1997 | Lange .................. F16B 7/0413 403/292 |
| 5,702,198 | A | * | 12/1997 | Kuo ........................ A45B 25/02 135/25.4 |
| 6,006,477 | A | * | 12/1999 | Ko ........................ A45B 19/04 135/25.4 |
| 7,300,059 | B2 | * | 11/2007 | Caruso ................. A63B 63/004 273/400 |
| 8,333,531 | B1 | * | 12/2012 | Wei .................... A63B 21/1681 403/379.6 |
| 9,968,212 | B1 | * | 5/2018 | Lundmark ................ F16B 2/04 |
| 2002/0164208 | A1 | * | 11/2002 | Koellner ................ F16B 12/40 403/292 |
| 2005/0008431 | A1 | * | 1/2005 | Albaugh .................. F16B 2/04 403/368 |
| 2007/0031187 | A1 | * | 2/2007 | McNeal ................... F16B 2/04 403/297 |
| 2011/0001315 | A1 | * | 1/2011 | Fischer ................ F16B 7/0413 285/31 |
| 2013/0005538 | A1 | * | 1/2013 | Coote ................ A63B 21/1681 482/33 |

* cited by examiner

CONNECTOR FOR CURTAIN RODS

CROSS-REFERENCE TO RELATED APPLICATIONS

This application claims the priority of China Patent Application No. 202421929076.8 filed on Aug. 8, 2024, entitled "Connector for Curtain Rods", all the contents and amendments of which are incorporated into this application by reference.

TECHNICAL FIELD

The present disclosure relates to the technical field of curtain equipment, in particular to a connector for curtain rods.

BACKGROUND

A curtain rod refers to the cross bar for hanging curtains having a cylindrical rod body and a length that is adjusted according to the size of the window. The two ends of the rod are curtain winding parts, which play the role of winding up and down the curtain. The rod body of the curtain rod is horizontally fixed above the window, and there are grooves on the rod for fixing the curtain. With the rotation of the curtain rod, the curtain is driven to open and close up and down.

However, in the prior art, the curtain rods need to be adjusted because the lengths of some windows are different, and therefore, curtain rods with different lengths need to be manufactured. Accordingly, mass production cannot be realized, and there are many inconveniences in transportation and installation of longer curtain rods.

For example, the existing U.S. Pat. No. 10,070,748 discloses "Curtain rod bracket and cam lock". The curtain rod of this patent has an integrated structure, and the length of the curtain rod cannot be adjusted, which causes the curtain rod to be inconvenient for transportation and storage.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present disclosure provides a connector for curtain rods to solve the problem that the curtain rod has an integrated structure, and the length of the curtain rod cannot be adjusted, which causes the curtain rod to be inconvenient for transportation and storage.

In order to achieve the above object, the present disclosure provides a connector for curtain rods, which includes a connector body for connecting two adjacent curtain rods; the connector body is formed by splicing a first connecting part and a second connecting part, and an adjusting bolt is inserted between the first connecting part and the second connecting part; when the two curtain rods are respectively inserted into the two ends of the spliced first connecting part and the second connecting part, the adjusting bolt passes through the first connecting part and then abuts against the second connecting part; a gap is generated between the first connecting part and the second connecting part, and the first connecting part and the second connecting part abut against inner walls of the curtain rods respectively, so that the first connecting part and the second connecting part are fixedly connected with the two adjacent curtain rods.

The present disclosure further provides a connector for curtain rods, which includes a connector body. The connector body is inserted between two adjacent curtain rods; the connector body is formed by splicing a first connecting part and a second connecting part, and there is an adjustable gap between the first connecting part and the second connecting part; the connector body is provided with an adjusting mechanism for adjusting the size of the gap; after the gap is adjusted, the connector body has a loosened state and a tensioned state; and when the connector body is in the tensioned state, an outer surface of the connector body abuts against the inner wall of the curtain rod.

The present disclosure further provides a connector for curtain rods, which includes a connector body; the connector body is inserted between two adjacent curtain rods; the connector body is formed by splicing a first connecting part and a second connecting part, and an adjusting member is arranged between the first connecting part and the second connecting part; when the connector body is connected between the two adjacent curtain rods, the adjusting member is able to separate the first connecting part from the second connecting part and generate an adjustable gap; after the gap is adjusted, the connector body has a loosened state and a tensioned state; when the connector body is in the tensioned state, an outer surface of the connector body abuts against an inner wall of the curtain rod.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Reference signs: Connector body (1); Curtain rod (2); First connecting part (3); Second connecting part (4); Adjusting bolt (5); Threaded connection hole (6); Groove (7); Inner hexagonal hole (8); First cavity (9); First reinforcing rib (10); Second cavity (11); Second reinforcing rib (12); Limiting groove (13); Arc transition section (14); Positioning groove (15); Limiting part (16); Insertion part (17).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As shown in FIGS. 1 to 7, the present disclosure provides a connector for curtain rods, which includes a connector body 1. The connector body 1 is used for connecting two adjacent curtain rods 2. The connector body 1 is formed by splicing a first connecting part 3 and a second connecting part 4. When the two curtain rods 2 are respectively inserted into the two ends of the spliced first connecting part 3 and the second connecting part 4, the adjusting bolt 5 is screwed into the first connecting part 3 and pressed against the second connecting part 4, so that a gap is generated between the first connecting part 3 and the second connecting part 4. The first connecting part 3 and the second connecting part 4 are pressed against the inner wall of the curtain rod 2 respectively, thereby fixedly connecting the first connecting part 3 and the second connecting part 4 with the two curtain rods 2.

In this embodiment, the first connecting part 3 passes through the threaded connecting hole 6, and the second connecting part 4 is provided with a groove 7 corresponding to the threaded connecting hole 6. When the curtain rods 2 are inserted into the two ends of the connector body 1, the adjusting bolt 5 is screwed into the threaded connecting hole 6 and then pressed into the groove 7. First, the first connecting part 3 and the second connecting part 4 are spliced, then two curtain rods 2 are inserted into the two ends of the connecting part body 1, and subsequently the adjusting bolt 5 is screwed into the threaded connecting hole 6 and pressed into the groove 7. With the rotation of the adjusting bolt 5, the first connecting part 3 and the second connecting part 4 will be far away from each other, thus generating a gap between the first connecting part 3 and the second connecting part 4. With the gap gradually increasing, the first connecting part 3 and the second connecting part 4 can abut against the inner wall of the curtain rod 2. Thereby, the connector body 1 is in a tensioned state, and the first connecting part 3 and the second connecting part 4 are fixedly connected with the two curtain rods 2. On the contrary, if the adjusting bolt 5 is screwed in the opposite direction to rotate, the gap will gradually decrease, the outer surface of the connector body 1 is released from the contact with the inner wall of the curtain rod 2, and then the connector body 1 will be in a loosened state, so that the connector body 1 can be pulled out of the curtain rod 2.

In the preferred solution of this embodiment, the threaded connecting hole 6 is located in the middle portion of the first connecting part 3, and the groove 7 is correspondingly located in the middle portion of the second connecting part 4. The diameter of the groove 7 is larger than that of the adjusting bolt 5, and the top of the adjusting bolt 5 is provided with an inner hexagonal hole 8. The threaded connecting hole 6 and the groove 7 are arranged in the middle of the connector body 1, so that after the adjusting bolt 5 is screwed in, when the first connecting part 3 and the second connecting part 4 are uniformly stressed when being pressed against the inner wall of the curtain rod 2.

In this embodiment, the adjusting bolt 5 is screwed into the first connecting part 3 and the second connecting part 4 to generate a gap and clamp the curtain rod 2. In other embodiments (not shown), the above adjustment mechanism can be replaced by other adjustment methods. For example, it can be a cam locking mechanism. By rotating the cam, the internal wedge-shaped block or claw is pushed to expand outward and clamp the curtain rod 2. It may also be a structure of an inclined sliding groove and a locking pin, wherein the first connecting part 3 is provided with a sliding groove, the second connecting part 4 is provided with a locking pin which can slide into the inclined sliding groove, the locking pin can slide on the inclined sliding groove and be locked at a specific position through a pushing mechanism, and the inclined sliding groove makes a gap be generated between the first connecting part 3 and the second connecting part 4 and clamps the curtain rod 2.

In this embodiment, the adjustment member is preferably an adjustment bolt 5. In other possible embodiments (not shown) of the adjusting member 5, the adjusting member may also be an elastic member, such as a spring, a rubber block, etc. The elastic member is embedded between the first connecting part 3 and the second connecting part 4, and is compressed to have a resilience, so that after the connector body 1 is inserted between two adjacent curtain rods 2, the elastic piece will rebound if the connector body 1 is loosened, and a gap will be generated between the first connecting part 3 and the second connecting part 4 by separating them apart. In this way, the elastic member can fix the connector body 1 between the two curtain rods 2 with its own elasticity.

In other possible embodiments of the adjusting member 5 (not shown), the adjusting member 5 may also be a wedge. After the connector body 1 is inserted between two adjacent curtain rods 2, a wedge is inserted between the first connecting part 3 and the second connecting part 4, which will separate the first connecting part 3 and the second connecting part 4 apart and create a gap therebetween. With the gradual deepening of the wedge, the gap will gradually increase, thus adjusting the connector body 1 to a tensioned state and fixing it between the two curtain rods 2.

In the preferred solution of this embodiment, the first connecting part 3 has a semi-cylindrical structure, and the first connecting part 3 is provided with a first cavity 9 having an opening oriented toward the second connecting part 4, and a first reinforcing rib 10 is provided in the first cavity 9. The arrangement of the first cavity 9 reduces the weight of the first connecting part 3, and the arrangement of the first reinforcing rib 10 improves the structural strength of the first connecting part 3. The second connecting part 4 has a semi-cylindrical structure, and the second connecting part 4 is provided with a second cavity 11 having an opening oriented toward the first connecting part 3, and a second reinforcing rib 12 is provided in the second cavity 11. The arrangement of the second cavity 11 reduces the weight of the second connecting part 4, and the arrangement of the second reinforcing ribs 12 improves the structural strength of the second connecting part 4.

In other embodiments (not shown), the shapes, numbers and positions of the first reinforcing ribs 10 and the second reinforcing ribs 12 may be adjusted to achieve the same structural strength effect. For example, more complex reinforcement structures, such as honeycomb structures or mesh structures, can be used, which can provide a higher strength with a lighter weight.

Figure 1:
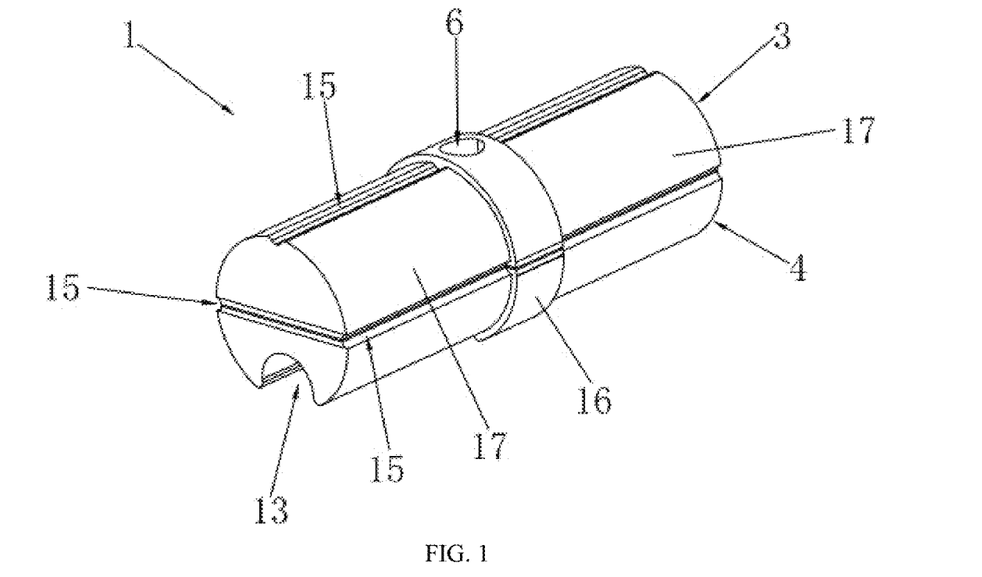
FIG. 1 is a schematic structural diagram of a connector of the present disclosure.
Figure 2:
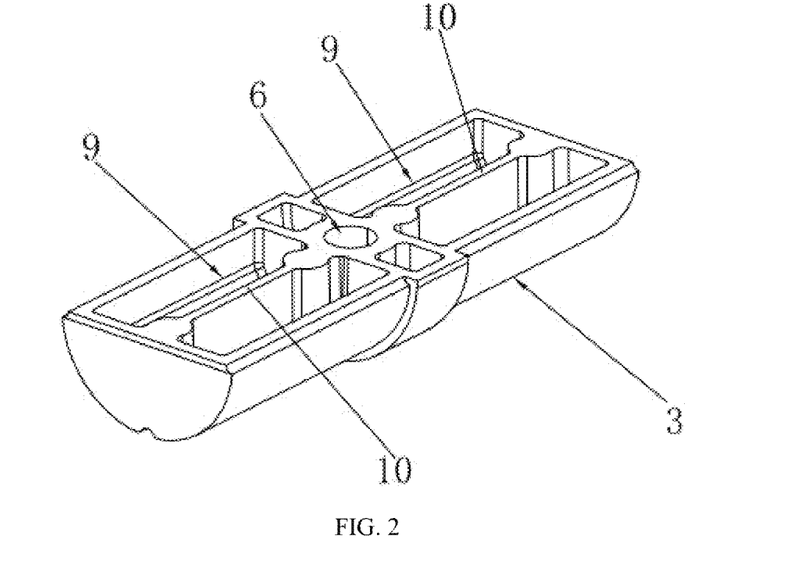
FIG. 2 is a schematic structural diagram of the bottom surface of the first connecting part in the present disclosure.
Figure 3:
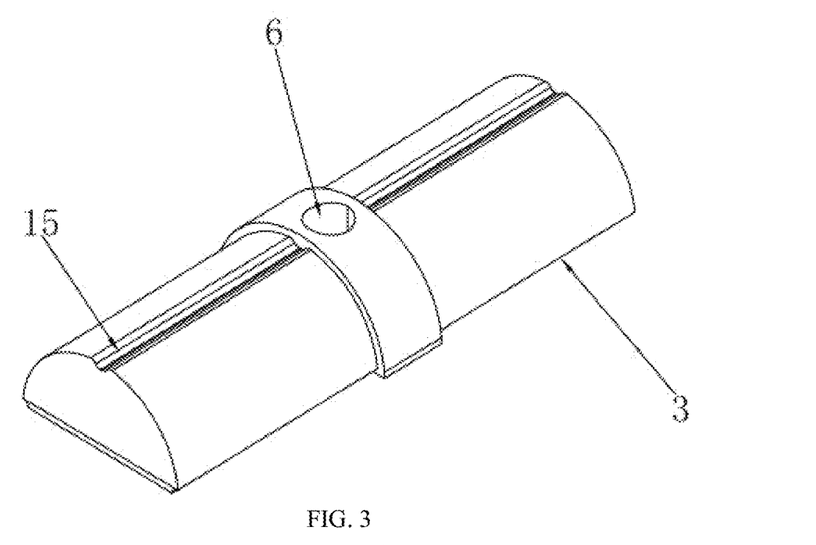
FIG. 3 is a schematic structural view of the top surface of the first connecting part in the present disclosure.
Figure 4:
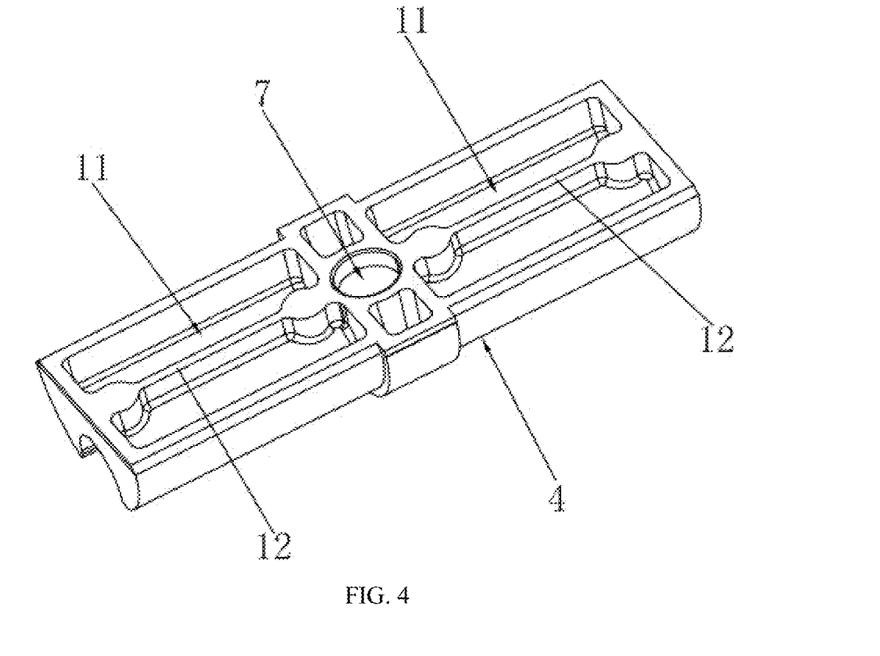
FIG. 4 is a schematic structural view of the top surface of the second connecting part in the present disclosure.
Figure 5:
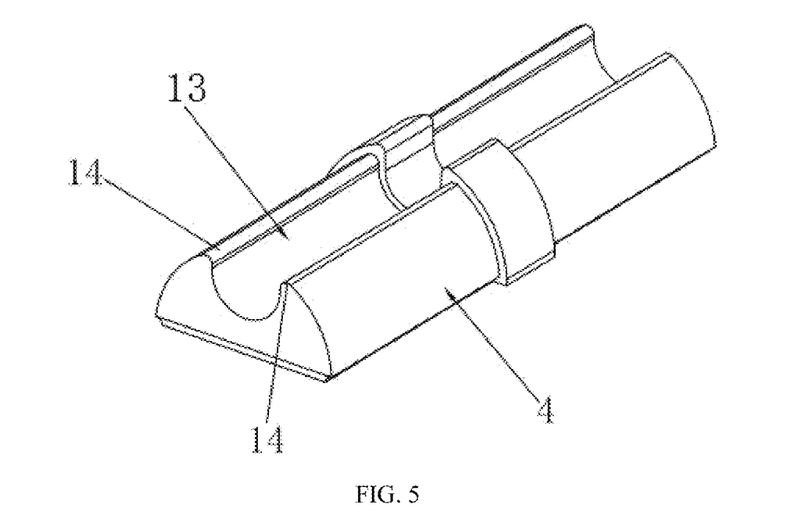
FIG. 5 is a schematic structural view of the bottom surface of the second connecting part in the present disclosure.
Figure 6:
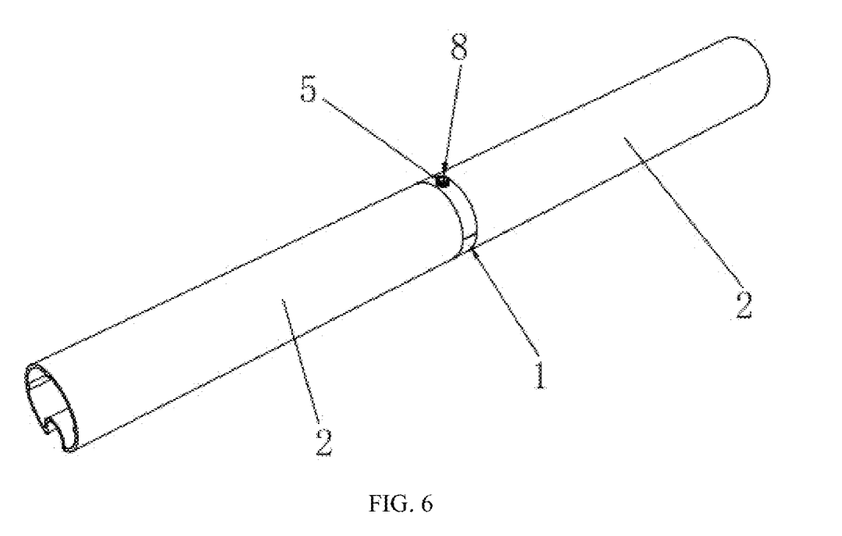
FIG. 6 is a schematic structural diagram of the connection of two curtain rods in the present disclosure.
Figure 7:
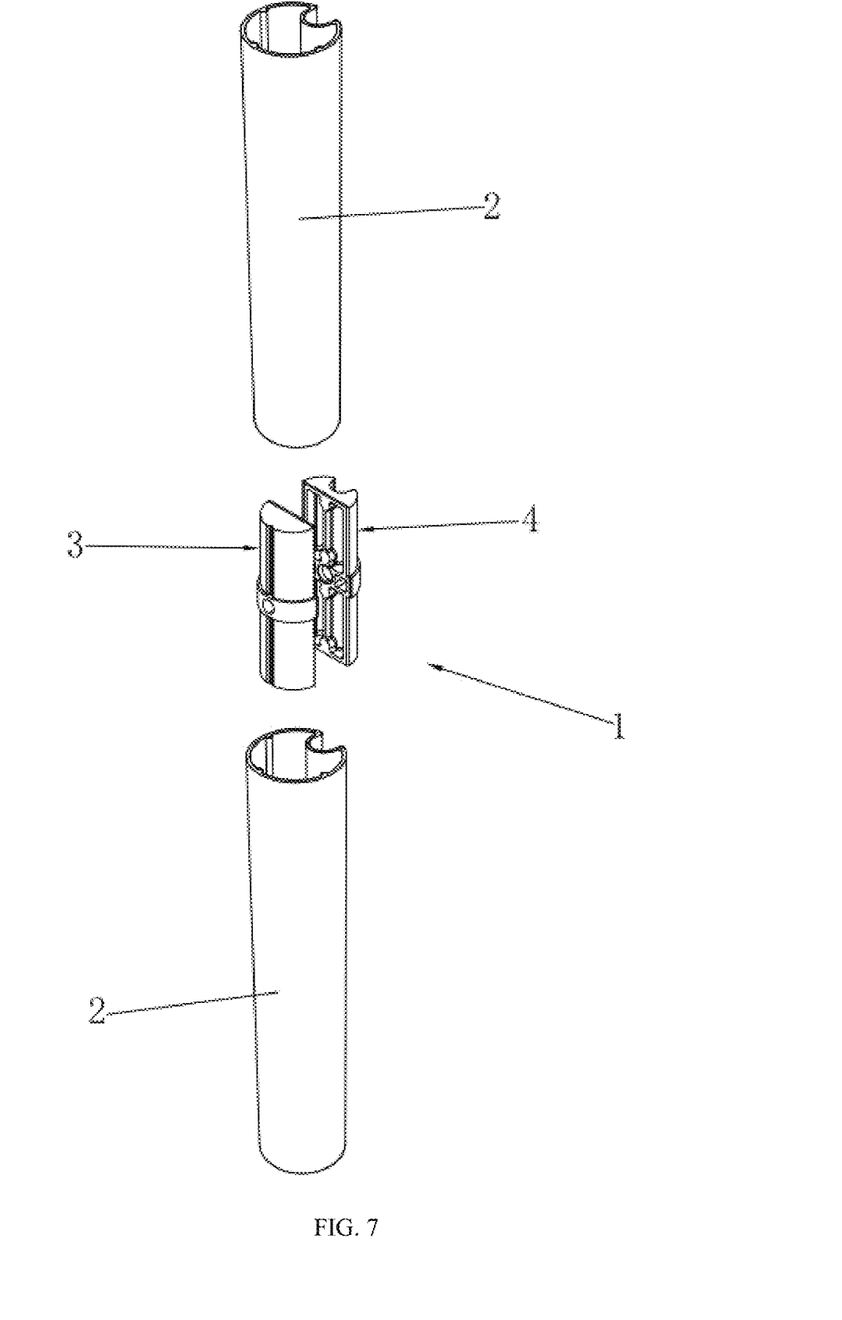
FIG. 7 is an explosion diagram of FIG. 6.

In the preferred solution of this embodiment, the connector body 1 is provided with a limiting groove 13, and the limiting groove 13 is configured to be matched with the curtain rod 2. The curtain rod 2 is recessed inward to form a slideway, so that the inner wall of the curtain rod 2 protrudes inward to form a convex part. The limiting groove 13 is configured to be matched with the convex part, so that after the curtain rods 2 are inserted into the two ends of the connector body 1, the limiting groove 13 plays a limiting role on the curtain rods 2, and the curtain rods 2 are prevented from rotating. The limiting groove 13 is a circular arc, and an arc transition section 14 is arranged between the limiting groove 13 and the connector body 1. The arrangement of the arc transition section 14 improves the aesthetics and plays a protective role in the installation process. Positioning grooves 15 are distributed on the periphery of the connector body 1, and the positioning grooves 15 are configured to be configured to be matched with the curtain rods 2. Positioning protrusions are distributed around the inner wall of the curtain rod 2, and the positioning protrusions are configured to be matched with the positioning grooves 15 to position the curtain rods 2.

In other embodiments (not shown), the limiting groove 13 can be replaced by other limiting mechanisms, such as elastic buckles, rotary locking pins or magnetic limiting devices. These mechanisms can also limit the rotation of the curtain rods, but they may have different installation and disassembly convenience. If the design of the curtain rod 2 allows, it is also possible to consider setting slots or holes on the curtain rod 2 to be matched with the protrusions or pins on the connector body 1 to realize the limit function.

In the preferred solution of this embodiment, the middle portion of the connector body 1 is provided with a limiting part 16, so that the two ends of the connector body 1 form an insertion part 17. The diameter of the limiting part 16 is larger than that of the insertion part 17. When the curtain rods 2 are inserted into the two ends of the connector body 1 through the insertion part 17, the ends of the curtain rods 2 abut against the limiting part 16. The insertion part 17 is used to install the curtain rods 2, and the limiting part 16 plays a role in limiting the installation of the curtain rods 2. The limiting part 16 has an annular structure, and the section of the limiting part 16 is configured to be matched with the section of the curtain rod 2. The consistency between the limiting part 16 and the curtain rod 2 is ensured, and the limiting part 16 is prevented from protruding or sinking between the two curtain rods 2.

In other embodiments (not shown), the specific shape and size of the insertion part 17 may be adjusted according to the cross section of the curtain rod 2 and the installation requirements. For example, if the curtain rod 2 is square, the insertion part 17 may also be square; if the curtain rod 2 needs to be fitted more closely, the insertion part 17 may be designed to have slight taper or elastic deformation. The insertion part 17 may also contain other auxiliary structures, for example guide grooves, positioning holes or anti-skid textures, so as to improve the convenience and stability of installation.

In conclusion, when the present disclosure is used: firstly, the first connecting part 3 and the second connecting part 4 are spliced to form the connector body 1, then two curtain rods 2 are respectively inserted into the two ends of the connector body 1 through the insertion part 17, and at the same time the end parts of the curtain rods 2 at the two ends respectively abut against the two ends of the limiting part 16; then the adjusting bolt 5 is screwed into the threaded connecting hole 6 of the first connecting part 3, and the adjusting bolt 5 passes through the threaded connecting hole 6 and abuts against the groove 7; the adjusting bolt 5 is screwed continuously, so that a gap is generated between the first connecting part 3 and the second connecting part 4; the first connecting part 3 and the second connecting part 4 abut against the inner wall of the curtain rod 2, thereby fixedly connecting the first connecting part 3 and the second connecting part 4 with the curtain rods 2.

According to the present disclosure, the connector body 1 is provided, and the connector body 1 is formed by splicing the first connecting part 3 and the second connecting part 4. When in use, the first connecting part 3 and the second connecting part 4 are spliced first, then the two curtain rods 2 are respectively inserted into the two ends of the connector body 1; then the adjusting bolt 5 is screwed into the first connecting part 3 and pressed against the second connecting part 4, so that a gap is generated between the first connecting part 3 and the second connecting part 4, and the first connecting part 3 and the second connecting part 4 abut against the inner wall of the curtain rod 2, thereby fixedly connecting the two curtain rods 2 with the connector body 1, enabling the curtain rods 2 to be spliced and combined with each other to have different lengths, which is applicable for windows with different lengths, realizing mass production and facilitating transportation and installation.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A connector for curtain rods, comprising a connector body for connecting two adjacent curtain rods, wherein
   the connector body is formed by splicing a first connecting part and a second connecting part, and an adjusting bolt is inserted between the first connecting part and the second connecting part;
   the connector is configured such that when the two curtain rods are respectively inserted into two ends of the spliced first connecting part and second connecting part, the adjusting bolt passes through the first connecting part and then abuts against the second connecting part; a gap is generated between the first connecting part and the second connecting part, and the first connecting part and the second connecting part abut against inner walls of the curtain rods respectively, so that the first connecting part and the second connecting part are fixedly connected with the two adjacent curtain rods;
   the first connecting part has a semi-cylindrical structure, the first connecting part is provided with a first cavity having an opening oriented toward the second connecting part, and a first reinforcing rib is provided in the first cavity; and
   the second connecting part has a semi-cylindrical structure, the second connecting part is provided with a second cavity having an opening oriented toward the first connecting part, and a second reinforcing rib is provided in the second cavity.

2. The connector for curtain rods according to claim 1, wherein a threaded connecting hole penetrates the first connecting part, and the second connecting part is provided with a groove corresponding to the threaded connecting hole; when the curtain rods are inserted into the two ends of the connector body, the adjusting bolt is screwed into the threaded connecting hole and pressed against the groove.

3. The connector for curtain rods according to claim 2, wherein the threaded connecting hole is positioned in a middle portion of the first connecting part, and the groove is correspondingly located in a middle portion of the second connecting part; the groove has a diameter larger than that of the adjusting bolt, and the top of the adjusting bolt is provided with an inner hexagonal hole.

4. The connector for curtain rods according to claim 1, wherein the connector body is provided with a limiting groove which is configured to be matched with the curtain rods.

5. The connector for curtain rods according to claim 4, wherein the limiting groove is a circular arc, and an arc transition section is arranged between the limiting groove and the connector body.

6. The connector for curtain rods according to claim 5, wherein positioning grooves are distributed on the periphery of the connector body, and the positioning grooves are configured to be matched with the curtain rods.

7. The connector for the curtain rod according to claim 1, wherein a middle portion of the connector body is provided with a limiting part, so that the two ends of the connector body form an insertion part, and the limiting part has a diameter larger than that of the insertion part; when the curtain rods are inserted into the two ends of the connector body by the insertion part, the ends of the curtain rods abut on the limiting part.

8. The connector for curtain rods according to claim 7, wherein the limiting part has an annular structure, and the section of the limiting part is configured to be matched with that of the curtain rod.

9. The connector for curtain rods according to claim 1, wherein each of the first cavity, the first reinforcing rib, the second cavity, and the second reinforcing, is inside the connector body.

10. A connector for curtain rods, comprising a connector body, wherein
the connector body is inserted between two adjacent curtain rods;
the connector body is formed by splicing a first connecting part and a second connecting part, and there is an adjustable gap between the first connecting part and the second connecting part;
the connector body is provided with an adjusting mechanism for adjusting the size of the gap;
the connector is configured such that after the gap is adjusted, the connector body has a loosened state and a tensioned state;
the connector is configured such that when the connector body is in the tensioned state, an outer surface of the connector body abuts against the inner wall of the curtain rod;
the first connecting part has a semi-cylindrical structure, the first connecting part is provided with a first cavity having an opening oriented toward the second connecting part, and a first reinforcing rib is provided in the first cavity; and
the second connecting part has a semi-cylindrical structure, the second connecting part is provided with a second cavity having an opening oriented toward the first connecting part, and a second reinforcing rib is provided in the second cavity.

11. The connector for curtain rods according to claim 10, wherein the adjusting mechanism comprises an adjusting bolt, a threaded connecting hole and a groove, and the adjusting bolt is inserted between the threaded connecting hole and the groove.

12. The connector for curtain rods according to claim 11, wherein the threaded connecting hole is provided in the first connecting part, and the groove is provided the second connecting part corresponding to the threaded connecting hole.

13. The connector for curtain rods according to claim 12, wherein when the connector body is inserted into two adjacent curtain rods, the adjusting bolt passes through the threaded connecting hole and abuts into the groove.

14. A connector for curtain rods, comprising a connector body, wherein
the connector body is inserted between two adjacent curtain rods; and
the connector body is formed by splicing a first connecting part and a second connecting part, and an adjusting member is arranged between the first connecting part and the second connecting part;
the connector is configured such that when the connector body is connected between the two adjacent curtain rods, the adjusting member is able to separate the first connecting part from the second connecting part and generate an adjustable gap;
the connector is configured such that after the gap is adjusted, the connector body has a loosened state and a tensioned state;
the connector is configured such that when the connector body is in the tensioned state, an outer surface of the connector body abuts against an inner wall of the curtain rod;
the first connecting part has a semi-cylindrical structure, the first connecting part is provided with a first cavity having an opening oriented toward the second connecting part, and a first reinforcing rib is provided in the first cavity; and
the second connecting part has a semi-cylindrical structure, the second connecting part is provided with a second cavity having an opening oriented toward the first connecting part, and a second reinforcing rib is provided in the second cavity.

15. The connector for curtain rods according to claim 14, wherein the adjusting member is an adjusting bolt, the first connecting part penetrates through a threaded connecting hole, and the second connecting part is provided with a groove corresponding to the threaded connecting hole.

16. The connector for curtain rods according to claim 15, wherein the adjusting bolt passes through the threaded connecting hole and abuts into the groove.

17. The connector for curtain rods according to claim 14, wherein the adjusting member is an elastic body, and the elastic body is compressed in the gap.

18. The connector for curtain rods according to claim 14, wherein the adjusting member is a wedge, and the wedge is inserted into the gap.

* * * * *